(12) United States Patent
Rossi

(10) Patent No.: US 9,374,989 B1
(45) Date of Patent: Jun. 28, 2016

(54) FISHING ATTACHMENT FOR FISHING LURES

(71) Applicant: Innovative Fishing Products, LLC, Dover, DE (US)

(72) Inventor: Wayne M. Rossi, Dover, DE (US)

(73) Assignee: Innovative Fishing Products, LLC, Dover, DE (US)

( * ) Notice: Subject to any disclaimer, the term of this patent is extended or adjusted under 35 U.S.C. 154(b) by 252 days.

(21) Appl. No.: 14/270,979

(22) Filed: May 6, 2014

Related U.S. Application Data

(63) Continuation-in-part of application No. 13/653,632, filed on Oct. 17, 2012, now Pat. No. 8,793,925.

(60) Provisional application No. 61/643,202, filed on May 4, 2012, provisional application No. 61/885,157, filed on Oct. 1, 2013.

(51) Int. Cl.
*A01K 85/00* (2006.01)

(52) U.S. Cl.
CPC ...................................... *A01K 85/00* (2013.01)

(58) Field of Classification Search
USPC ............ 43/42.25, 42.53, 42.37, 42.29, 42.28, 43/42.24
See application file for complete search history.

(56) References Cited

U.S. PATENT DOCUMENTS

| | | |
|---|---|---|
| 5,386,658 A | 2/1995 | Ferguson et al. |
| 5,491,927 A | 2/1996 | Ortiz |
| 5,709,047 A | 1/1998 | Link |
| 5,899,015 A | 5/1999 | Link |
| 5,960,580 A | 10/1999 | Link |
| 6,418,659 B1 | 7/2002 | Shelton |
| 6,598,336 B2 | 7/2003 | Link |
| 7,647,722 B2 | 1/2010 | Shelton et al. |
| 8,196,336 B2 | 6/2012 | Nicholson, III |
| 8,434,258 B2 | 5/2013 | Greene et al. |

*Primary Examiner* — Christopher P Ellis
(74) *Attorney, Agent, or Firm* — Schwartz Law Firm, P.C.

(57) ABSTRACT

A fishing lure includes at least one hook having a point, bend, and shank. The fishing lure further comprises a fishing attachment arranged adjacent the hook. The fishing attachment comprises a lure dressing. A dressing harness carries the lure dressing, and comprises a substantially hollow punch-through friction core and at least one elongated flexible wing. The punch-through core is adapted for receiving the point of the hook to apply and frictionally hold the fishing attachment in a desired location relative to the hook of the fishing lure. A grip ridge is formed with the flexible wing of the dressing harness, and is adapted for being gripped by a user when applying and removing the fishing attachment to and from the hook of the fishing lure.

19 Claims, 15 Drawing Sheets

FISHING ATTACHMENT FOR FISHING LURES

TECHNICAL FIELD AND BACKGROUND OF THE INVENTION

This invention relates broadly and generally to the fishing industry, and more particularly to a fishing attachment and method for dressing a fishing lure having multiple integrally-joined hooks. In other exemplary embodiments described herein, the present disclosure is applicable for use on single-hook fishing lures and flexible fishing lines.

In terms of recreational fishing, a "lure" is a commonly known and understood reference to any one or more objects attached to a fishing line and designed to resemble and move like an item of fish prey. The basic purpose of the lure is to use movement, vibrations, and/or color to catch the fish's attention and to entice the fish to "bite" the hook. Conventional lures may be equipped with one or more exposed single, double, or treble hooks. Such lures are generally used with a fishing rod and fishing reel. When a lure is used for casting, it is continually cast out and retrieved—the retrieval making the lure "swim" through the water. The concept of the present disclosure may be utilized in combination with many different types of lures, including (e.g.) jigs, surface lures, spoon lures, plugs, artificial flies, spinnerbaits and swimbaits.

SUMMARY OF EXEMPLARY EMBODIMENTS

Various exemplary embodiments of the present invention are described below. Use of the term "exemplary" means illustrative or by way of example only, and any reference herein to "the invention" is not intended to restrict or limit the invention to exact features or steps of any one or more of the exemplary embodiments disclosed in the present specification. References to "exemplary embodiment," "one embodiment," "an embodiment," "various embodiments," and the like, may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

It is also noted that terms like "preferably", "commonly", and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

According to one exemplary embodiment, the present disclosure comprises a fishing attachment for an artificial fishing lure having multiple integrally-joined hooks. The fishing attachment includes a lure dressing, such as any fish-attracting object, and a dressing harness carrying the lure dressing. The dressing harness comprises a plurality of pre-formed hook holes adapted for receiving respective points of the multiple hooks, such that the fishing attachment resides adjacent respective bends of the multiple hooks and extends outwardly from a tail end of the fishing lure.

The terms "artificial fishing lure", "fishing lure", "lure" or the like are defined broadly herein to mean any manmade device used alone, or in combination with other live, naturally occurring, or manmade devices, elements, or structure, for purposes of attracting and/or catching fish. Examples of common fishing lures include (but are not limited to) jigs, surface lures, spoon lures, plugs, artificial flies, spinnerbaits and swimbaits. Additionally, a single hook, a double or treble hook, or other hook combination, alone or together with other accessories or dressings, comprises a fishing lure as broadly defined herein.

The term "integrally-joined hooks" is used herein to mean a plurality of hooks and/or hook parts joined together by brazing or banding the shanks, welding, or the like.

The term "lure dressing" refers broadly herein to mean any fish-attracting object or lure accessory including, for example, feathers, bucktail, fishing skirts, nylon weed guards, rattle chambers, natural (live) and artificial baits, and the like.

The term "pre-formed hook hole" refers to any shaped opening or perforation defined in or by the dressing harness, or any pre-formed area of reduced strength or thickness designed for being penetrated by a point of the hook.

According to one exemplary embodiment, the lure dressing comprises a silicone rubber fishing skirt.

According to another exemplary embodiment, the fishing skirt comprises a multiplicity of elongated flexible strands.

According to another exemplary embodiment, the fishing skirt comprises a centrally-disposed female fitting (e.g., flat ring defining recess, socket or opening).

According to another exemplary embodiment, the dressing harness comprises a winged connector having a centrally-disposed male fitting (e.g., elongated post or the like) mated with the female fitting of the fishing skirt. The exemplary connector may be fabricated of any suitable flexible, semi-flexible, or rigid material.

According to another exemplary embodiment, the winged connector comprises a plurality of elongated integrally formed flexible hook-receiving wings diverging from each other, and defining respective pre-formed hook holes of the dressing harness. The flexible wings of the exemplary connector may be integrally molded together as a single homogenous unit.

According to another exemplary embodiment, the winged connector comprises at least three equally-spaced, hook-receiving wings.

According to another exemplary embodiment, the winged connector consists of three equally-spaced, hook-receiving wings.

According to another exemplary embodiment, the winged connector is constructed of a durable and substantially flexible material.

In another exemplary embodiment, the present disclosure comprises the combination of a fishing attachment and an artificial fishing lure having multiple integrally-joined hooks. The fishing attachment includes a lure dressing, and a dressing harness carrying the lure dressing. The dressing harness comprises a plurality of pre-formed hook holes adapted for receiving respective points of the multiple hooks, such that the fishing attachment resides adjacent respective bends of the multiple hooks and extends outwardly from a tail end of the fishing lure.

In yet another exemplary embodiment, the present disclosure comprises a method for dressing an artificial fishing lure having multiple integrally-joined hooks. The method includes inserting respective points of the multiple hooks through pre-formed hook holes in a dressing harness carrying lure dressing of a fishing attachment, and locating the fishing attachment adjacent respective bends of the multiple hooks such that the lure dressing extends outwardly from a tail end of the fishing lure.

In yet another exemplary embodiment, the present disclosure comprises a fishing attachment for use with an artificial fishing lure comprising at least one hook having a point, bend, and shaft. The fishing attachment comprises a lure dressing. A dressing harness carries the lure dressing, and comprises at least one elongated flexible wing defining a pre-formed wing hole adapted for receiving the point of the hook. A grip ridge is formed with the flexible wing of the dressing harness, and is adapted for being gripped by a user when applying and removing the fishing attachment to and from the hook of the artificial fishing lure.

In one example, the grip ridge may be integrally formed with the flexible wing. The term "integrally formed" means formed together as a single homogenous unit (e.g., molded).

According to another exemplary embodiment, the dressing harness comprises a plurality of diverging outwardly extending elongated flexible wings. Each flexible wing defines a pre-formed wing hole and comprises a grip ridge adapted for being gripped by a user when applying and removing the fishing attachment to and from the hook of the artificial fishing lure.

According to another exemplary embodiment, the dressing harness comprises three equally-spaced elongated flexible wings. Each flexible wing defines a pre-formed wing hole and comprising a grip ridge adapted for being gripped by a user when applying and removing the fishing attachment to and from the hook of the artificial fishing lure.

In yet another exemplary embodiment, the present disclosure comprises a fishing attachment for use with an artificial fishing lure. The fishing lure comprises at least one hook having a point, bend, and shaft. The exemplary attachment comprises a lure dressing. A dressing harness carries the lure dressing, and comprises a substantially hollow punch-through friction core adapted for receiving the point of the hook to apply and frictionally hold the fishing attachment in a desired location relative to the hook of the artificial fishing lure. For example, the fishing attachment may be applied and held directly on the hook, directly on the flexible fishing line proximate the hook, or at any other location on, beside, adjacent, or near the hook.

According to another exemplary embodiment, the punch-through friction core defines a beveled pre-formed point hole.

According to another exemplary embodiment, the punch-through friction core further defines a generally conical hollow interior tapering from the point hole to a closed end adapted for being pierced by the point of the hook.

According to another exemplary embodiment, the punch-through friction core of the dressing harness forms a centrally disposed male fitting mated with the female fitting of the fishing skirt.

In yet another exemplary embodiment, the present disclosure comprises an artificial fishing lure including at least one hook having a point, bend, and shank. The fishing lure further comprises a fishing attachment arranged adjacent the hook. The fishing attachment comprises a lure dressing. A dressing harness carries the lure dressing, and comprises a substantially hollow punch-through friction core and at least one elongated flexible wing. The punch-through core is adapted for receiving the point of the hook to apply and frictionally hold the fishing attachment in a desired location relative to the hook of the artificial fishing lure. A grip ridge is formed with the flexible wing of the dressing harness, and is adapted for being gripped by a user when applying and removing the fishing attachment to and from the hook of the artificial fishing lure.

BRIEF DESCRIPTION OF THE DRAWINGS

Exemplary embodiments of the present invention will hereinafter be described in conjunction with the following drawing figures, wherein like numerals denote like elements, and wherein:

FIGS. 11 and 11A are views illustrating the grip ridges formed with the elongated wings of the skirt harness;

DESCRIPTION OF EXEMPLARY
EMBODIMENTS AND BEST MODE

The present invention is described more fully hereinafter with reference to the accompanying drawings, in which one or more exemplary embodiments of the invention are shown. Like numbers used herein refer to like elements throughout. This invention may, however, be embodied in many different forms and should not be construed as limited to the embodiments set forth herein; rather, these embodiments are provided so that this disclosure will be operative, enabling, and complete. Accordingly, the particular arrangements disclosed are meant to be illustrative only and not limiting as to the scope of the invention, which is to be given the full breadth of the appended claims and any and all equivalents thereof. Moreover, many embodiments, such as adaptations, variations, modifications, and equivalent arrangements, will be implicitly disclosed by the embodiments described herein and fall within the scope of the present invention.

Although specific terms are employed herein, they are used in a generic and descriptive sense only and not for purposes of limitation. Unless otherwise expressly defined herein, such terms are intended to be given their broad ordinary and customary meaning not inconsistent with that applicable in the relevant industry and without restriction to any specific embodiment hereinafter described. As used herein, the article "a" is intended to include one or more items. Where only one item is intended, the term "one", "single", or similar language is used. When used herein to join a list of items, the term "or" denotes at least one of the items, but does not exclude a plurality of items of the list.

For exemplary methods or processes of the invention, the sequence and/or arrangement of steps described herein are illustrative and not restrictive. Accordingly, it should be understood that, although steps of various processes or methods may be shown and described as being in a sequence or temporal arrangement, the steps of any such processes or methods are not limited to being carried out in any particular sequence or arrangement, absent an indication otherwise. Indeed, the steps in such processes or methods generally may be carried out in various different sequences and arrangements while still falling within the scope of the present invention.

Additionally, any references to advantages, benefits, unexpected results, or operability of the present invention are not intended as an affirmation that the invention has been previously reduced to practice or that any testing has been performed. Likewise, unless stated otherwise, use of verbs in the past tense (present perfect or preterit) is not intended to indicate or imply that the invention has been previously reduced to practice or that any testing has been performed.

Figure 1:
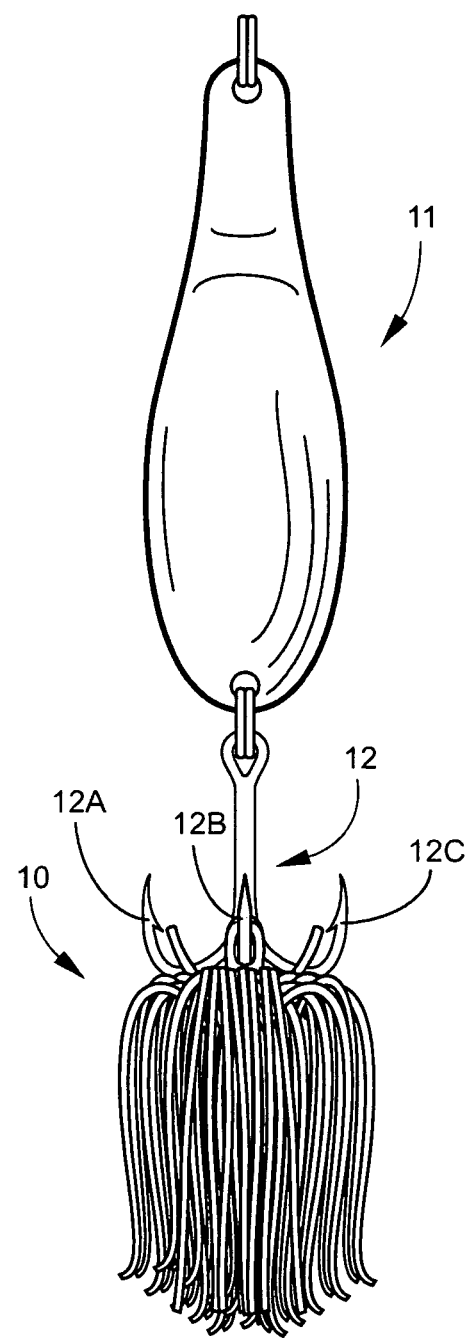
FIG. 1 is a view of the fishing attachment according to one exemplary embodiment of the present disclosure, and showing the attachment used in combination with an artificial treble-hook fishing lure.

Referring now specifically to the drawings, a fishing attachment according to one exemplary embodiment of the present disclosure is illustrated in FIG. 1, and shown generally at broad reference numeral 10. The exemplary attachment 10 is applicable for use in combination with an artificial fishing lure 11. In the embodiment shown, the fishing lure 11 includes a bare or otherwise "undressed" conventional treble hook 12. The treble hook 12 (best shown in FIG. 4) comprises three metal hooks 12A, 12B, 12C integrally-joined together, such as by brazing or banding the shanks, welding, or the like, and having a common eye 14, and respective elongated shanks 15, and evenly spaced bends 16 and points 17. The points 17 may or may not be barbed. The fishing attachment 10 of the exemplary disclosure is designed for being readily applied to and removed from the treble hook 12 to "dress" the lure 11 as desired by the user.

Figure 2:
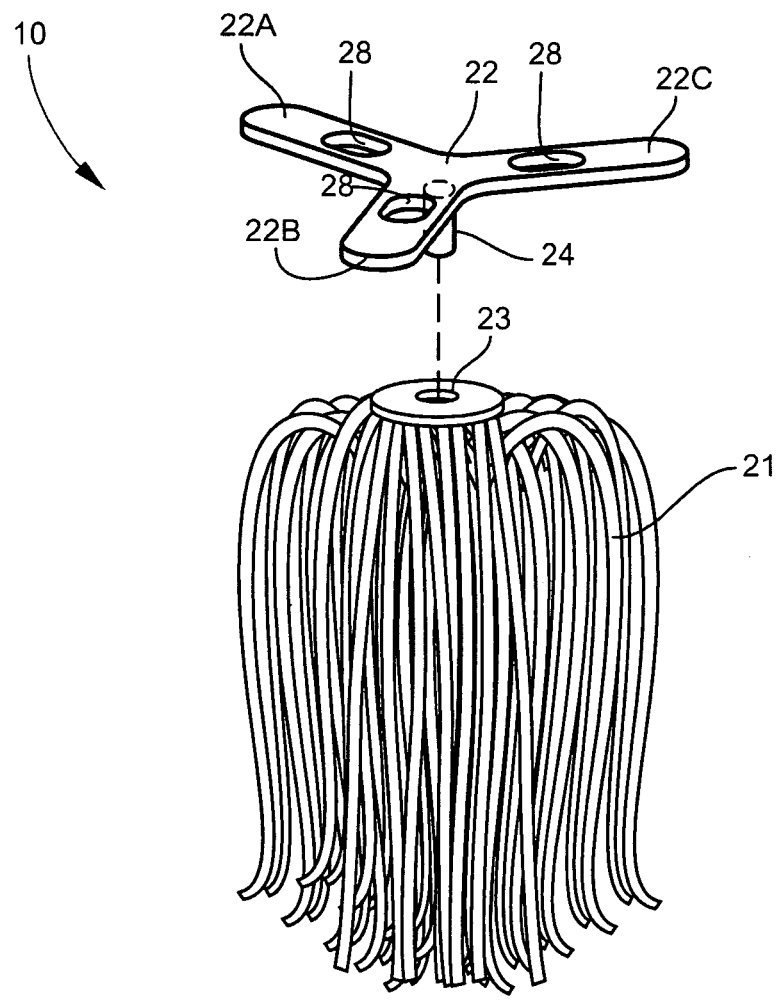
FIG. 2 is a perspective view of the exemplary fishing attachment with the fishing skirt and skirt harness separated to illustrate respective fittings provided to interconnect the components during manufacture.
Figure 3:
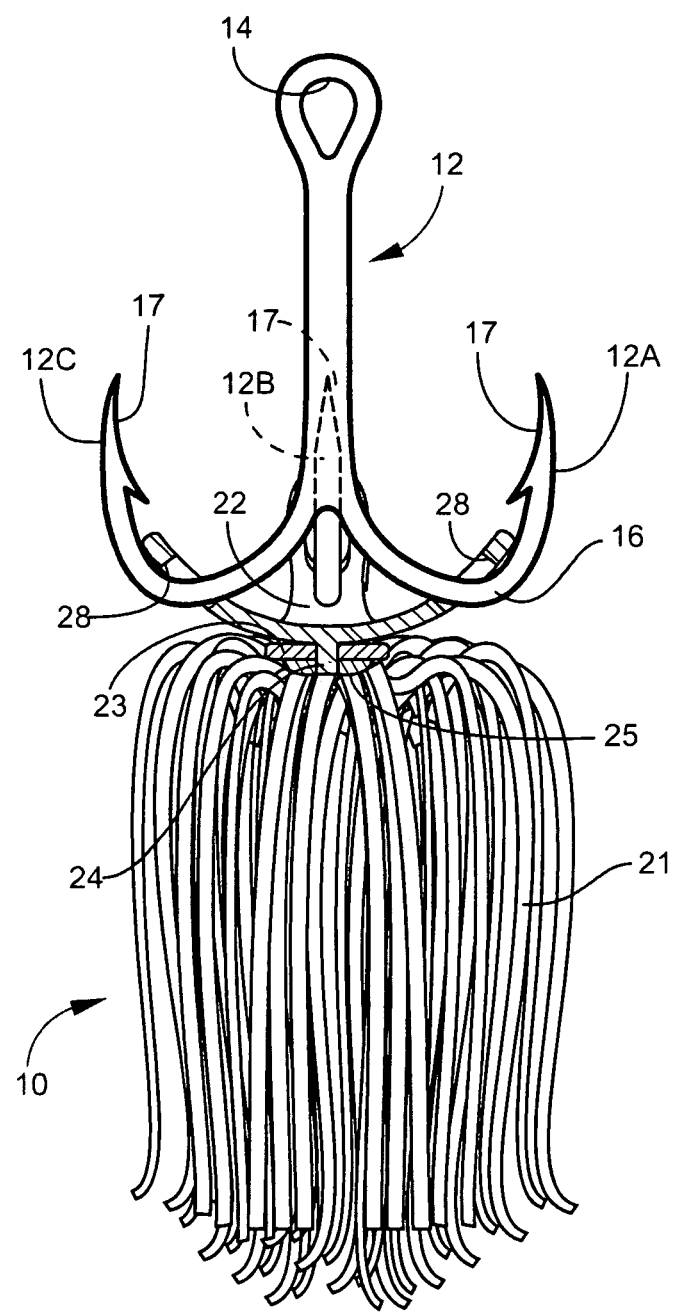
FIG. 3 is a view of the fishing attachment secured to the treble hook of the fishing lure, and showing portions of the attachment in cross-section.

Referring to FIGS. 2 and 3, the exemplary fishing attachment 10 comprises an interconnected fishing skirt 21 and skirt harness 22. The fishing skirt 21 and harness 22 have complementary female and male fittings 23, 24 which are mated, as best shown in FIG. 3, and permanently attached together by an epoxy resin 25. Other suitable attachment means may comprise rubber adhesives and other bonding agents, heat fusing, or integrally molding the components or parts of the components together. In alternative embodiments (not shown), the skirt 21 and harness 22 may be detachably connected to one another, and readily exchanged and replaced. The fishing skirt 21 may comprise multiple flexible coalesced strands of nonstick synthetic elastomeric polymer, such as silicone rubber. The strands may be formed in a variety of colors, or may be substantially clear or colorless.

Figure 4:
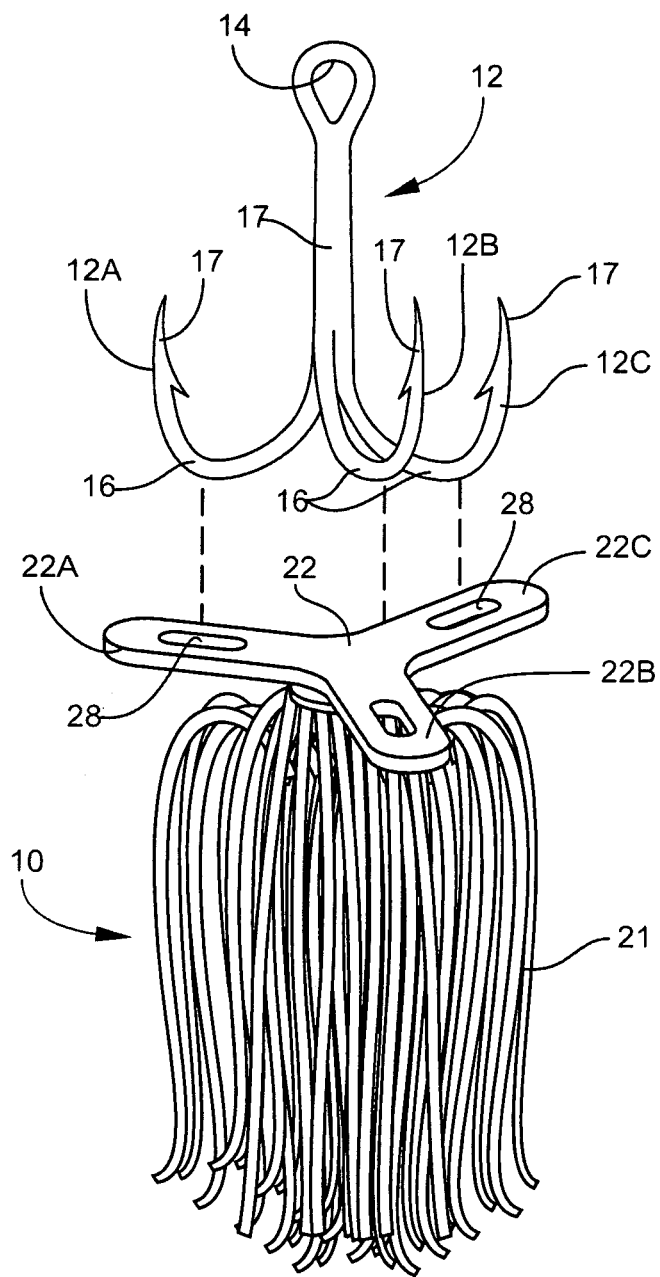
FIG. 4 is a perspective view of the fishing attachment removed from the treble hook of the fishing lure.
Figure 5:
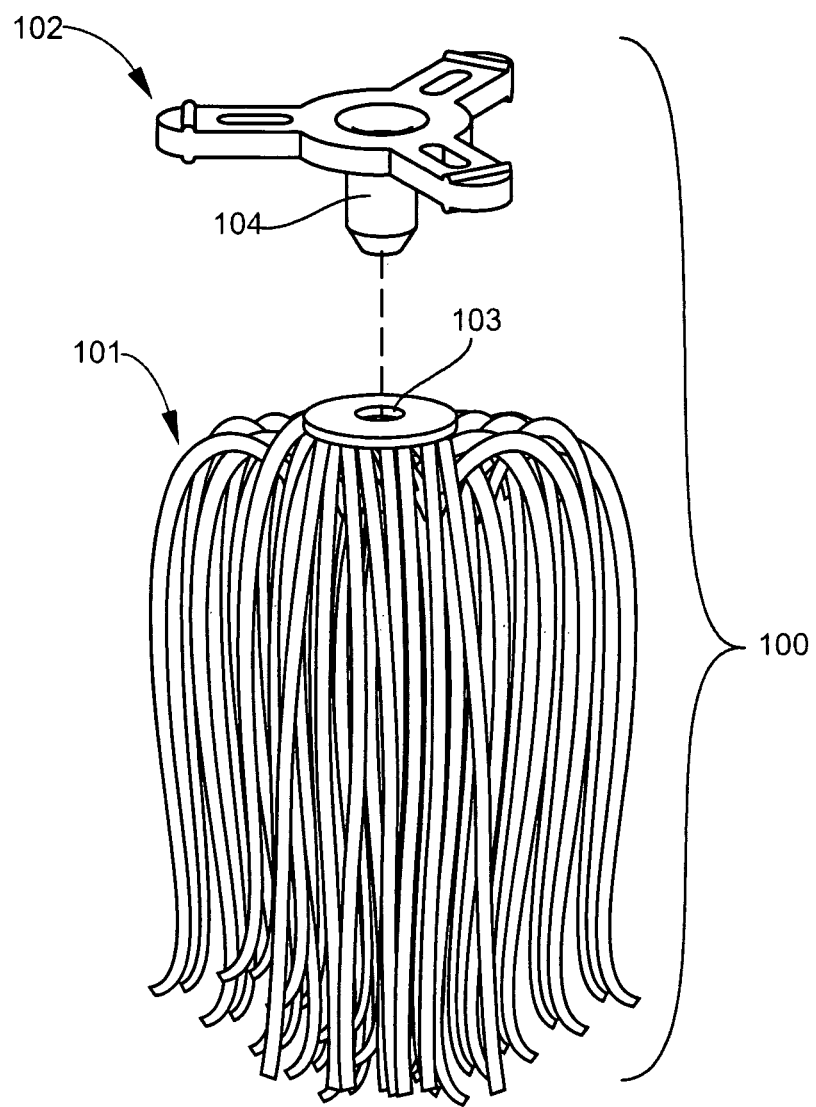
FIG. 5 is a perspective view of an alternative exemplary fishing attachment, and showing the fishing skirt and skirt harness separated to illustrate respective fittings provided to interconnect the components during manufacture.

As best shown in FIGS. 2 and 4, the exemplary skirt harness 22 comprises a winged connector including integrally-molded and radially diverging flexible wings 22A, 22B, 22C. The flexible wings 22A, 22B, 22C have identical dimensions and shape. In the exemplary embodiment, the flexible wings 22A, 22B, 22C are equally spaced apart from one another, and define pre-formed hook holes 28 which loosely receive respective points 17 of the treble hook 12. The "tri-winged" harness 22 may be applied to the treble hook 12 by inserting the point 17 of each metal hook 12A, 12B, 12C one-at-a-time through its corresponding wing hole 28, such that the skirt 21 depends from a tail end of the fishing lure 11. The wing holes 28 of the exemplary attachment 10 may have a substantially round, square, oval, or slotted shape, and are sufficiently large to enable ready application and removable of the harness 22 to and from the treble hook 12, but sufficiently small to effectively secure the attachment 10 to the hook 12 during use. The exemplary harness 22 may be fabricated of any suitably strong and durable material, including elastomeric polymers [such as latex, urethane, and natural and synthetic rubbers], thermoplastics [such as polyethylene, polypropylene, polystyrene, polycarbonate, polyvinyl chloride, and polytetrafluoroethylene (PTFE)], other flexible or rigid moldable compositions, metals, fabric, and the like.

Once the present attachment 10 is applied to the hook 12, the fisherman can now cast the lure 11 in the normal fashion and retrieve as usual. The skirt 21 wiggles and flows at the tail end of the lure 11, causing fish to be enticed in a manner known and understood in the industry. Should the fisherman desire to change the presentation of the lure 11 by adding color, or changing its size and/or motion, he can select an alternate attachment and follow the process described above to readily remove the existing attachment 10 and install the new one.

Figure 6:
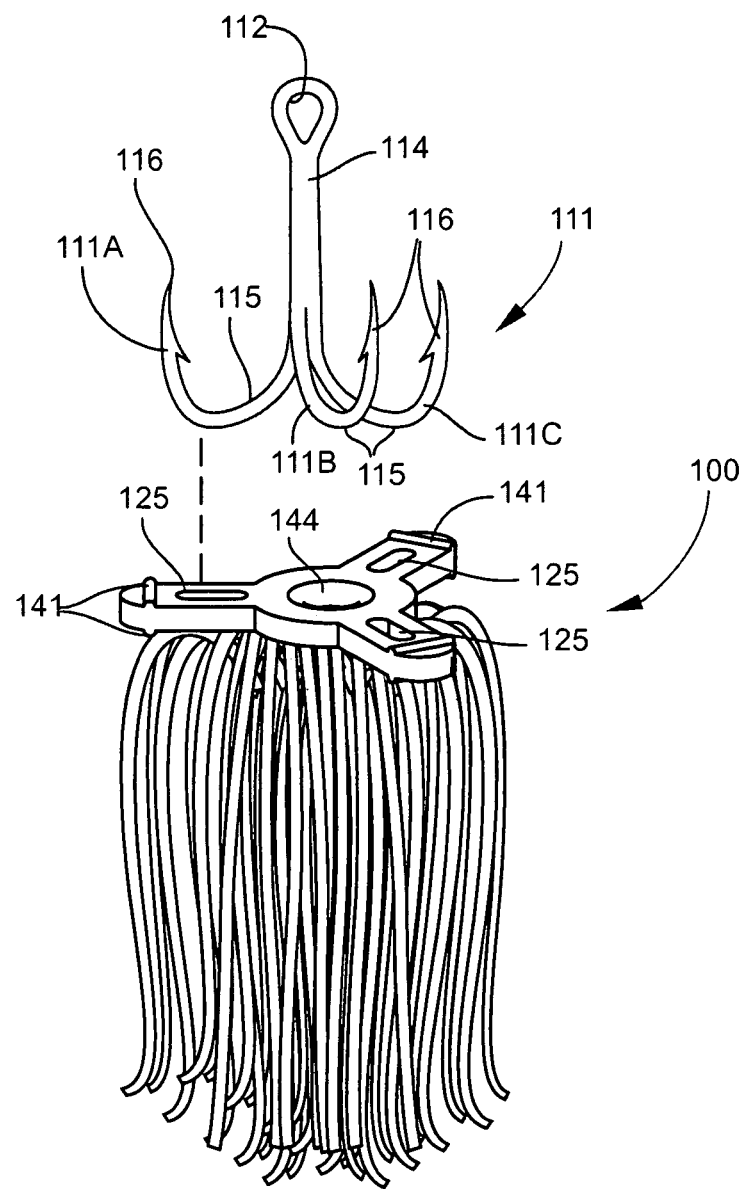
FIGS. 6 and 7 demonstrate application of the exemplary fishing attachment to a treble-hook fishing lure.
Figure 7:
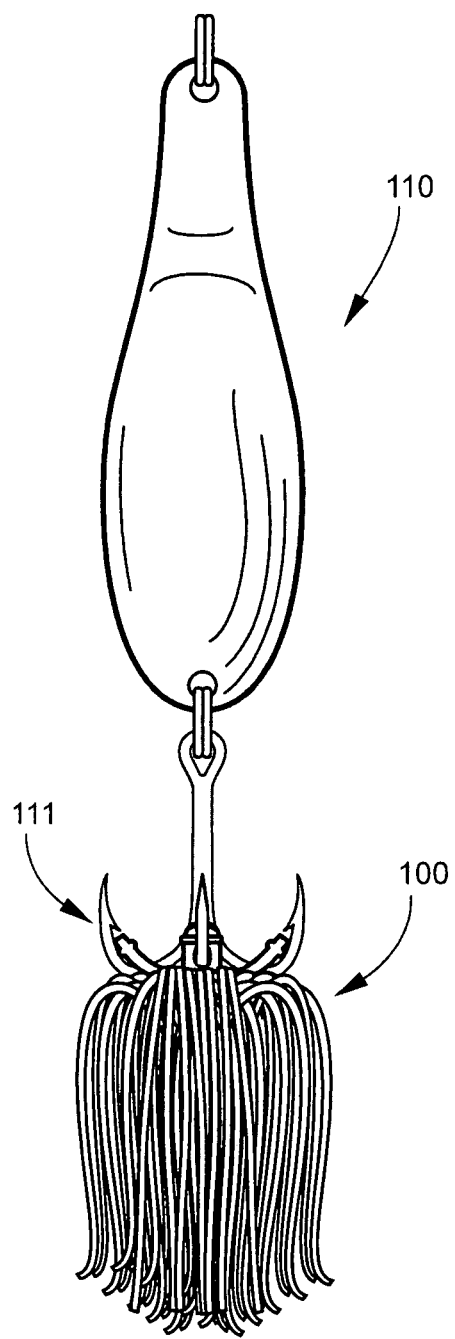

A further exemplary embodiment of the present disclosure is illustrated in FIGS. 5-15. Like fishing attachment 10 described above, the exemplary attachment 100 comprises an interconnected fishing skirt 101 and skirt harness 102. The fishing skirt 101 and harness 102 have complementary female and male fittings 103, 104, shown in FIG. 5, which are mated and permanently (or removably) attached together by any suitable mechanical means, adhesives, heat fusing, or the like. The fishing skirt 101 may comprise multiple flexible coalesced strands of nonstick synthetic elastomeric polymer, such as silicone rubber. As shown in FIGS. 6 and 7, the fishing attachment 100 is applicable for use with an artificial fishing lure 110 comprising a conventional "undressed" treble hook 111. The treble hook 111 incorporates three metal hooks 111A, 111B, 111C integrally-joined together, as previously described, by brazing or banding the shanks, welding, or the like, and having a common eye 112, an elongated shank 114, and evenly spaced bends 115 and points 116. The fishing attachment 100 is designed for being readily applied to and removed from the treble hook 111 to "dress" the lure 110 as desired by the user.

Figure 8:
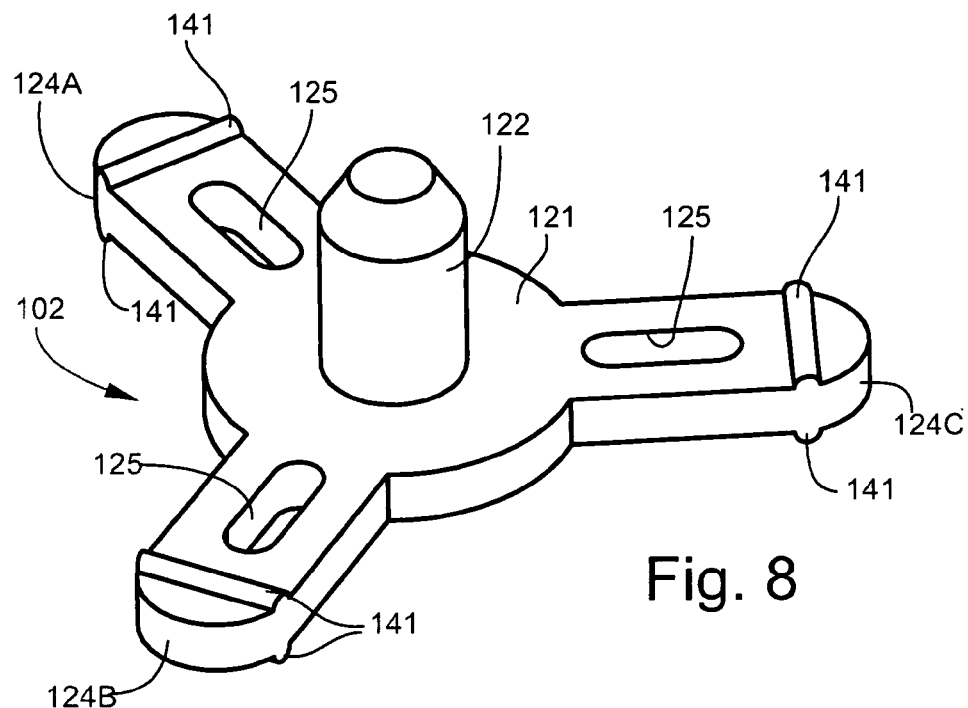
FIGS. 8 and 9 are opposing perspective views of the exemplary fishing attachment.
Figure 9:
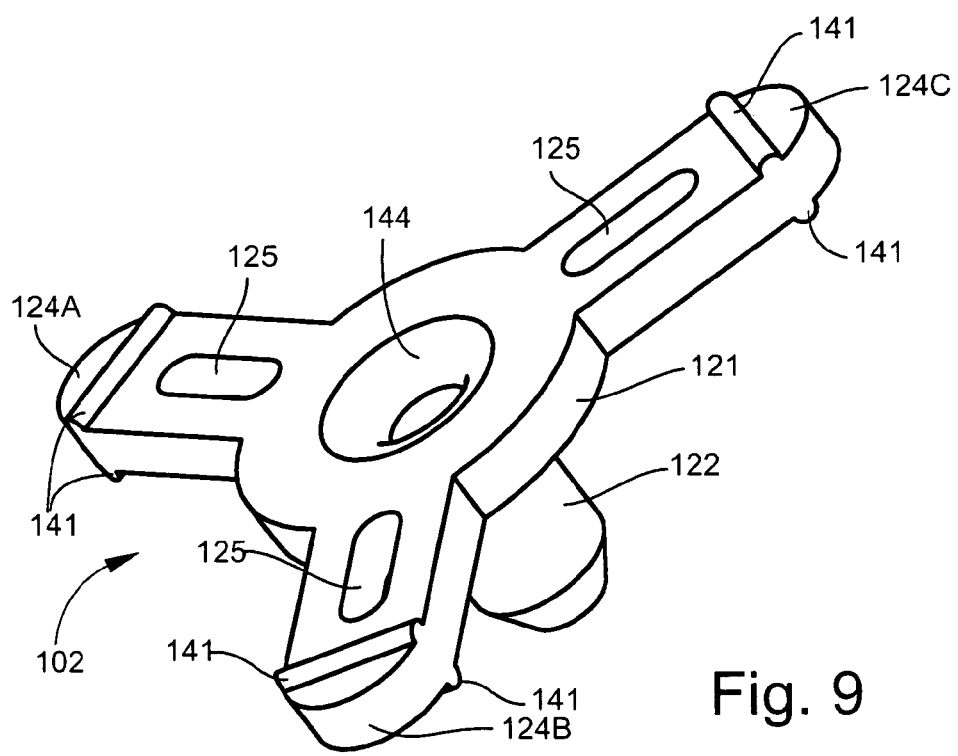
Figure 10:
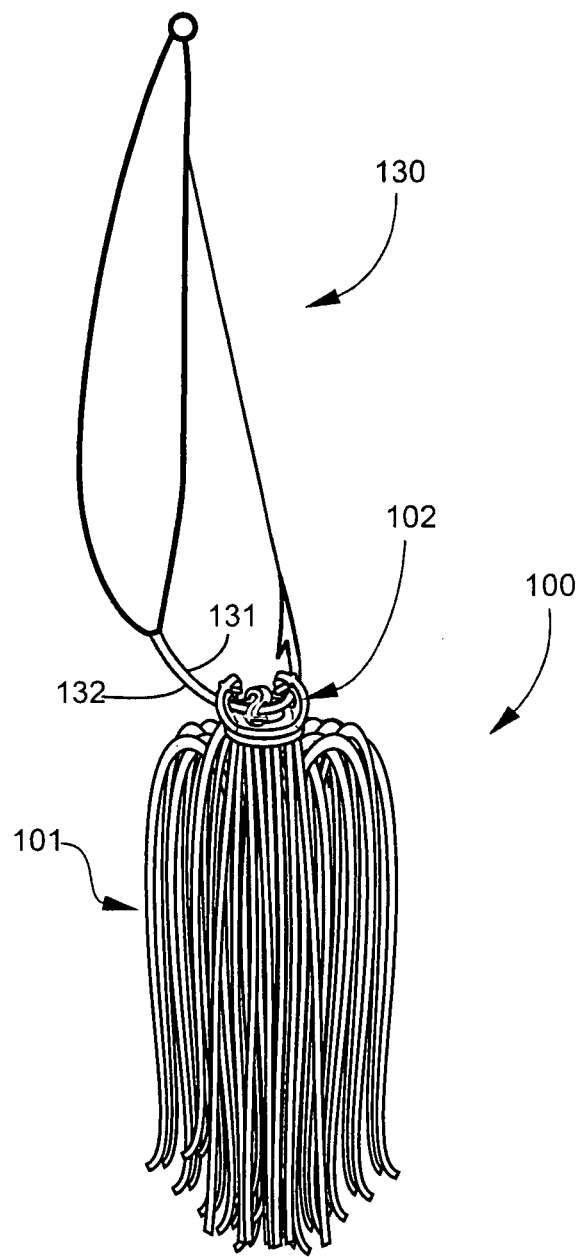
FIG. 10 is an environmental view of the fishing attachment carried on a single-hook fishing lure.
Figure 11:
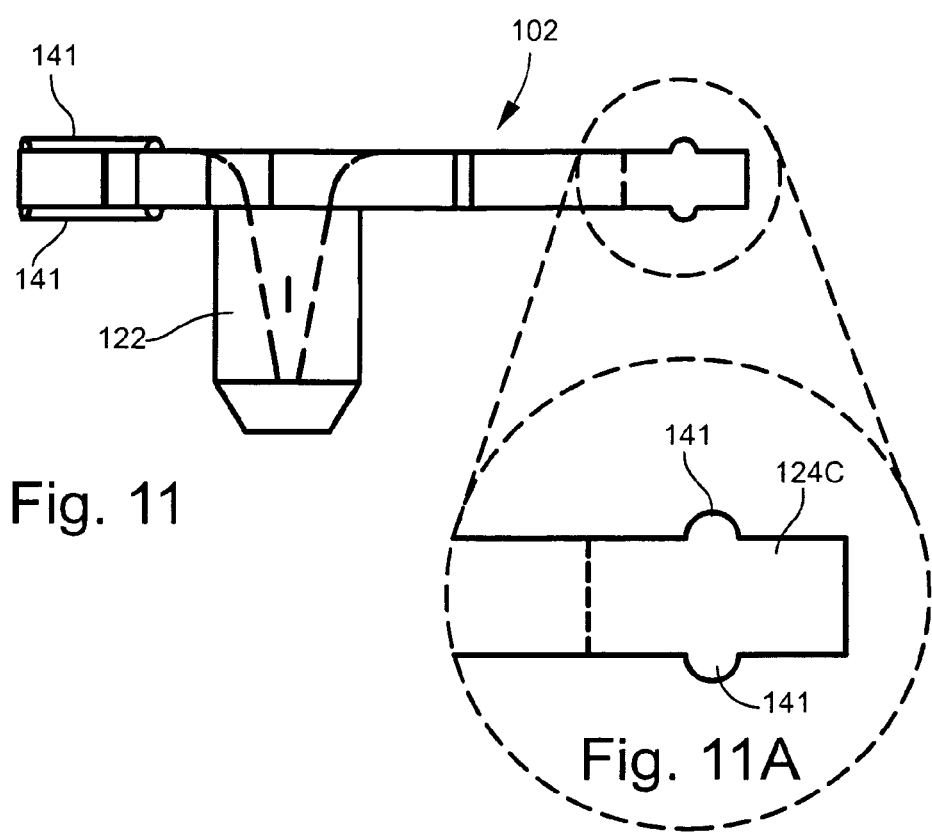

As best shown in FIGS. 8 and 9, the exemplary skirt harness 102 comprises a winged connector 121 having a substantially hollow punch-through friction core 122, and radially diverging elongated flexible wings 124A, 124B, 124C integrally formed with the friction core 122. The flexible wings 124A-124C have identical dimensions and shape, are equally spaced apart from one another, and define respective pre-formed wing holes 125. In one exemplary implementation (demonstrated in FIGS. 6 and 7), the wing holes 125 are designed to loosely receive respective points 116 of the treble hook 111. The "tri-winged" harness 102 may be applied to the treble hook 111, as previously described, by inserting the point 116 of each metal hook 111A-111C one-at-a-time through its corresponding wing hole 125, such that the skirt 101 depends from a tail end of the fishing lure 110. In an alternative implementation shown in FIG. 10, the exemplary fishing attachment 100 may be applied to a single-hook fishing lure 130 by inserting the point of the hook 131 through one or more of the wing holes 125, and then sliding the attachment 100 to a desired location proximate the bend 132. The exemplary harness 102 including the friction core 122 and elongated wings 124A-124C may be integrally formed together and fabricated of any suitably strong, flexible, and durable material, including homogenous elastomeric polymers or the like.

As best shown in FIGS. 8, 9, 11, and 11A, to facilitate its handling and application onto the treble hook 111, and subsequent removal from the hook 111, the skirt harness 102 of the exemplary fishing attachment 100 may comprise integrally-formed grip ridges 141 located at respective distal ends of the elongated flexible wings 124A-124C. The grip ridges may 141 be formed in pairs with each flexible wing 124A-124C—the ridges 141 of each wing being spaced apart from the wing hole 125 and projecting in substantial alignment from opposite sides of the harness 102. Each ridge 141 extends laterally and continuously from one side edge of the wing 124A-124C to the other. In alternative embodiments, the flexible wings 124A-124C may comprise multiple grip ridges on one or both sides of the harness 102.

Figure 12:
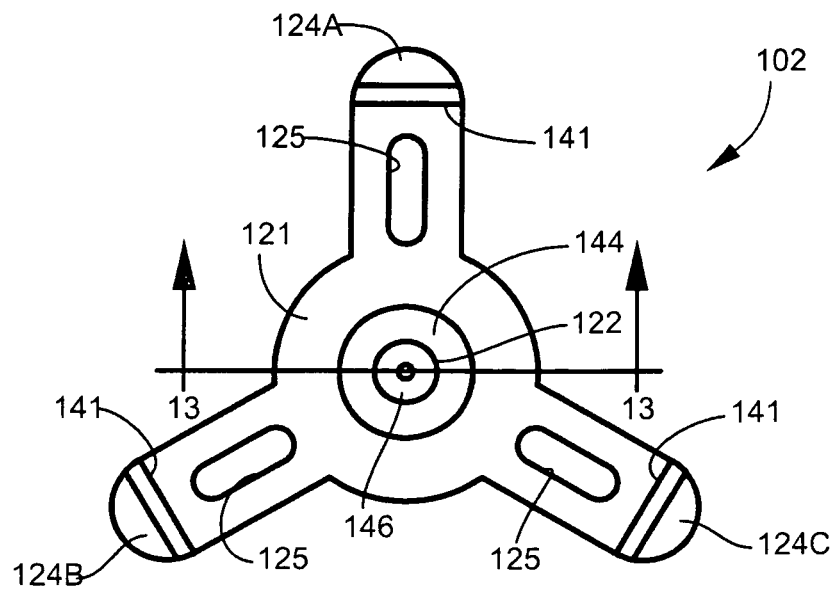
FIG. 12 is a plan view of the exemplary fishing attachment.
Figure 13:
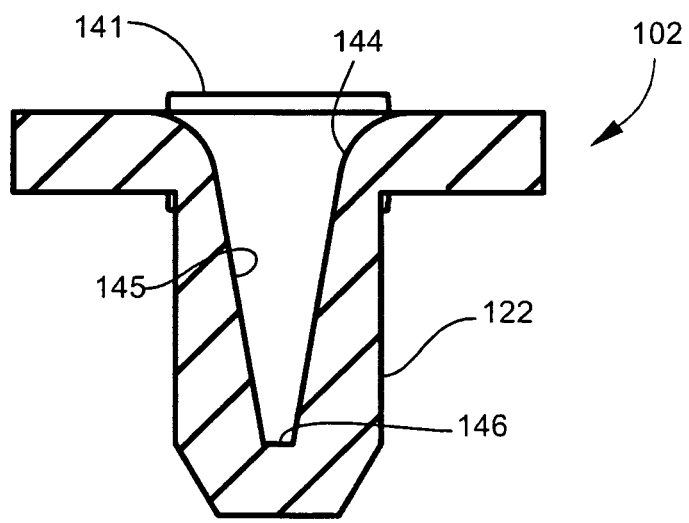
FIG. 13 is a cross-sectional view taken substantially along line 13-13 of FIG. 12.

Referring to FIGS. 12 and 13, the punch-through friction core 122 of the exemplary skirt harness 102 defines a beveled pre-formed point hole 144 and generally conical hollow interior 145. The core interior 145 tapers from the point hole 144 to a closed end 146 adapted for being pierced by the point of the hook. Once pierced by the hook, the exemplary friction core 122 serves to apply and frictionally hold the fishing attachment 100 (FIG. 14—skirt 101 plus harness 102) in a desired location relative to the hook of the lure. For example, the fishing attachment 100 may be applied and held directly on the hook, directly on the flexible fishing line proximate the hook, or at any other location on, beside, adjacent, or near the hook.

Figure 14:
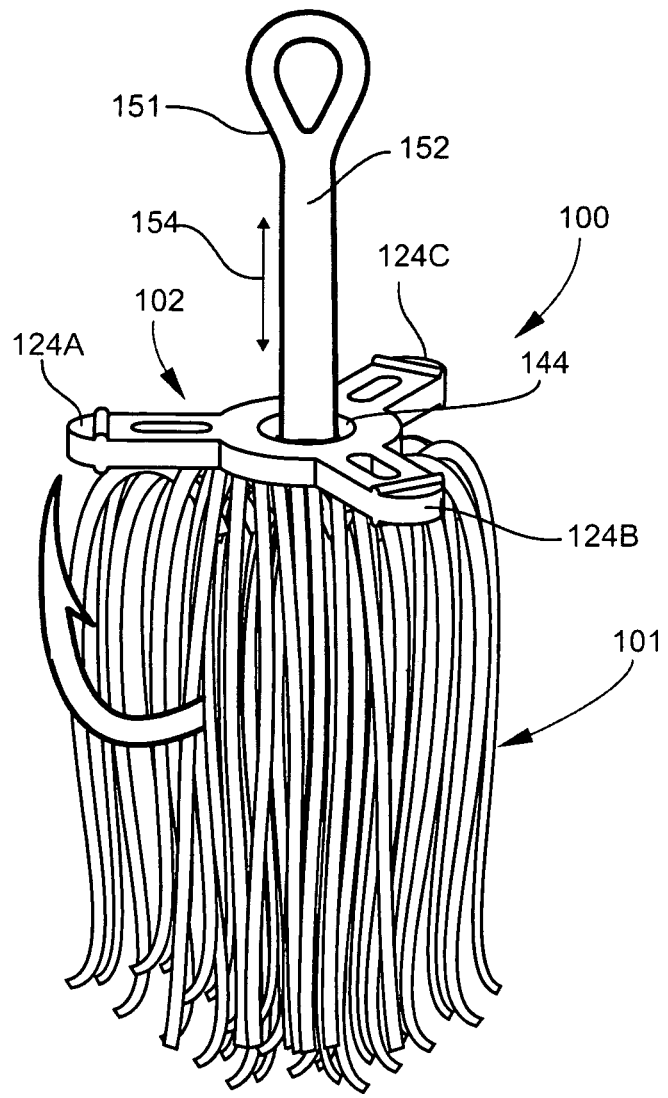
FIGS. 14 and 15 illustrate various exemplary implementation of the present fishing attachment.
Figure 15:
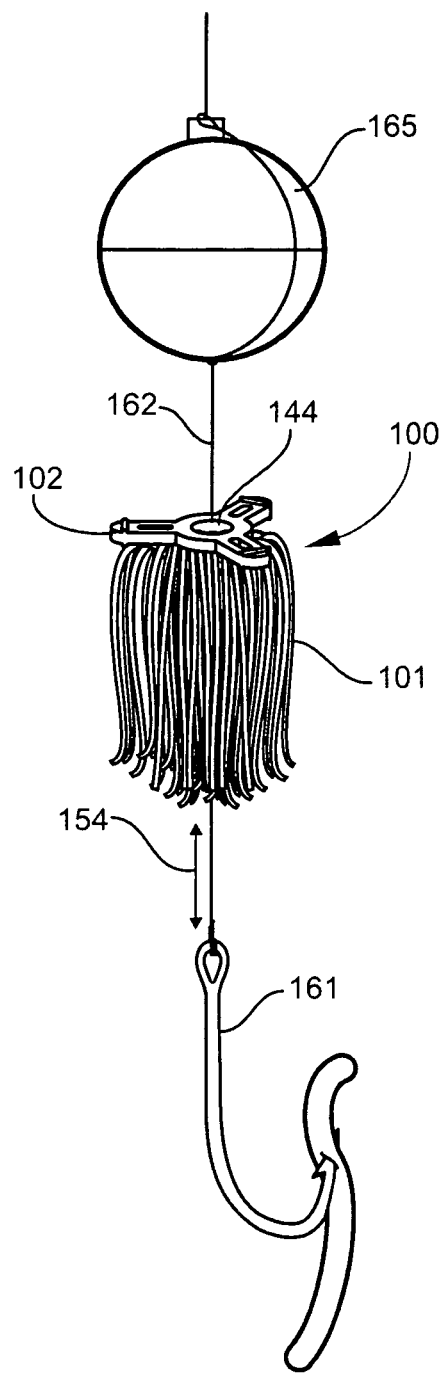

Exemplary implementations of the present fishing attachment 100 utilizing the punch-through friction core 122 (FIGS. 12 and 13) are illustrated in FIGS. 14 and 15. In each of these examples, the fisherman can manually grip and manipulate the fishing attachment 100 using one or more of the flexible ridged wings 124A-124C of the skirt harness 102. In FIG. 14, the point of the hook 151 enters the point hole 144 of the fishing attachment 100, pierces the friction core 122 at its tapered closed end 146 (FIGS. 12 and 13), and is moved along the bend to the shank 152 of the hook 151. The fishing attachment 100 may then be adjustably positioned at indicated by arrow 154 and frictionally retained at any desired location on the shank 152 to position the skirt 101 relative to the hook 151. In FIG. 15, the point of the hook 161 again enters the point hole 144 of the fishing attachment 100 and pierces the friction core 122 at its tapered closed end 146 (FIGS. 12 and 13). The attachment 100 is then moved along the bend and shank, and over the hook eye to the flexible fishing line 162. In this example, the fishing attachment 100 is adjustably positioned as indicated by arrow 164 and frictionally retained at any desired location on the fishing line 162 to position the skirt 101 proximate the hook 161 (and spaced from bobber 165).

Figure 16:
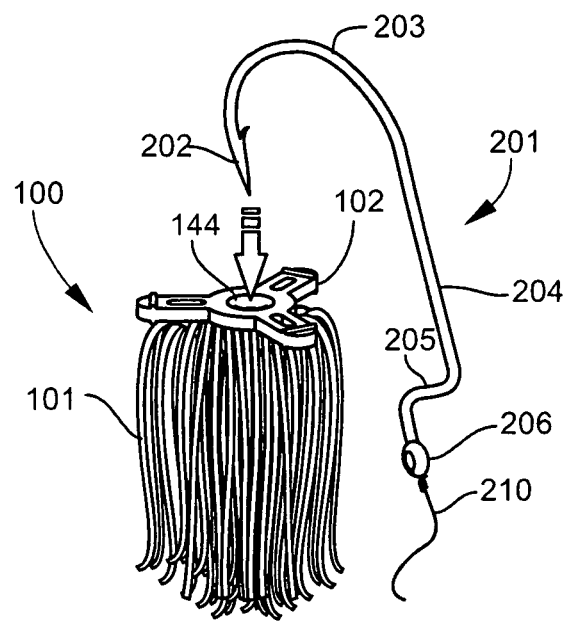
FIGS. 16 through 20 are sequential views demonstrating one technique for Texas-rigging a fishing line, and incorporating the exemplary fishing attachment of the present disclosure.
Figure 17:
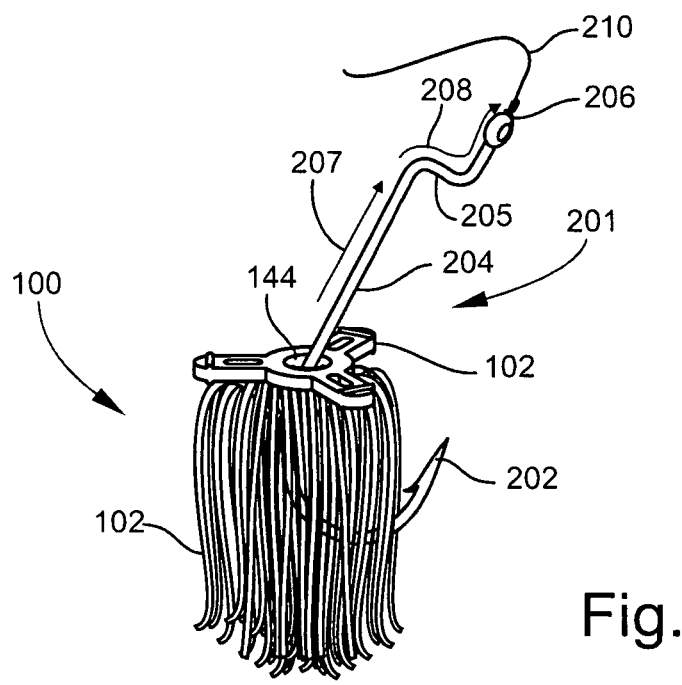
Figure 18:
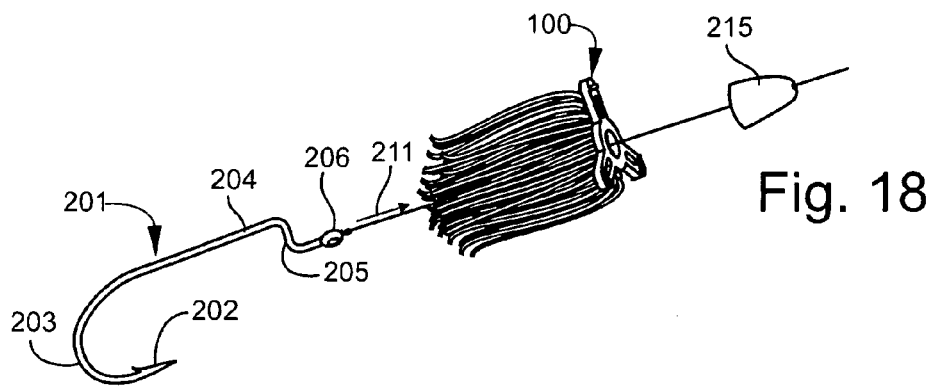
Figure 19:
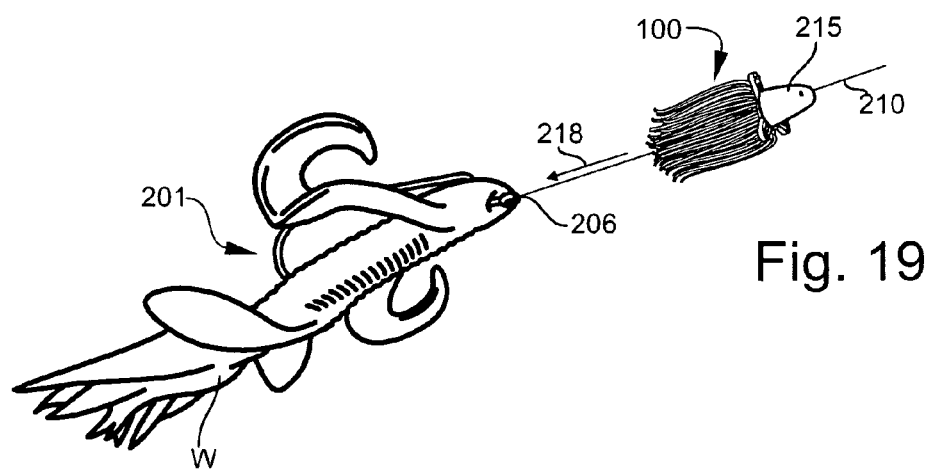
Figure 20:
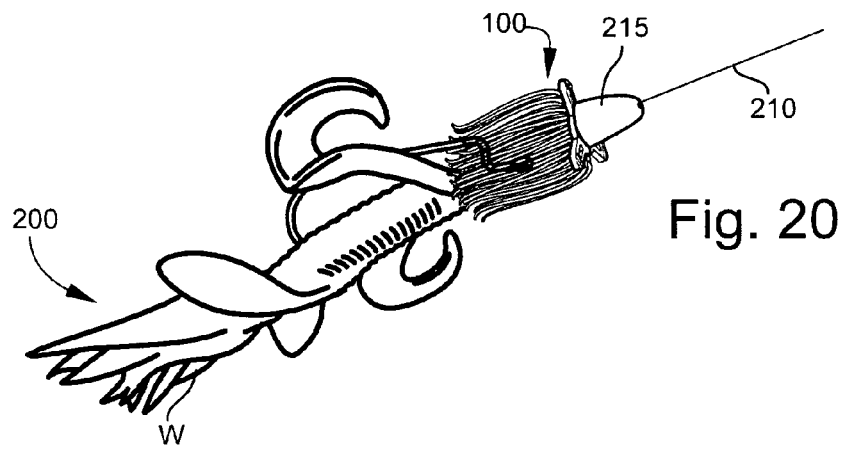

FIGS. 16-20 demonstrate a process for "Texas-rigging" a lure 200 comprising a soft plastic worm "W" (FIGS. 19 and 20), and incorporating and offset worm hook 201 and the exemplary fishing attachment 100. The fishing attachment 100 comprises skirt 101 and skirt harness 102 described above. As shown in FIGS. 16 and 17, the point 202 of the hook 201 enters the point hole 144 of the fishing attachment 100 and pierces the friction core 122 at its tapered closed end 146 (FIGS. 12 and 13), as previously described. The attachment 100 is then moved along the bend 203, shank 204, and offset 205, and over the hook eye 206 to the flexible fishing line 210, as indicated by arrows 207 and 208 in FIG. 17. The attachment 100 is slid away from the hook 201, as indicated by arrow 211 in FIG. 18, and frictionally held in position by the friction core 122. A bullet slip sinker 215 (previously threaded onto fishing line 210) may be temporarily spaced apart from the fishing attachment 100 and hook 201. With the fishing attachment 100 and sinker 215 moved away from the hook 201, as shown in FIG. 18, the fisherman inserts the point 202 of the hook 201 into a head region of the worm "W" and exits the worm about ¼ to ½ of an inch down its length. The worm "W" is then moved up the hook 201 towards the offset 205, and is then rotated so that the worm becomes securely held or locked on the shank 204. The point 202 of the hook 201 is then inserted back into the body of the worm "W" to make the rig weedless. After rigging the worm, the fishing attachment 100 and slip sinker 215 are moved down the line 210, as indicated by arrow 218 in FIG. 19, to the eye 206 of the hook 201 such that the skirt 101 substantially covers the head of the worm "W", as shown in FIG. 20. To replace or change the bait, the fishing attachment 100 and slip sinker 215 are slid along the fishing line 210 away from the hook 201 for convenient and unobstructed access to the worm. The skirt 101 may also be readily changed by cutting the line 210, sliding the fishing attachment 100 off the cut end, and then repeating the process described above with a new skirt attached to the skirt harness 102.

In other exemplary embodiments (not shown), the present fishing attachment may be modified for use on single or double hooks and other combination hooks having one or more points. The fishing attachment may be used in combination with any type or style fishing lure, and in combination with any variety of lure dressings and accessories. The fishing attachment, metal hook or hooks, and lure may be fabricated in any desired size and material, and all such variations are considered within the scope of the present invention. In further alternative embodiments, the exemplary skirt attachment may comprise a single flexible wing, two flexible wings, or 4 or more flexible wings.

For the purposes of describing and defining the present invention it is noted that the use of relative terms, such as "substantially", "generally", "approximately", and the like, are utilized herein to represent an inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

Exemplary embodiments of the present invention are described above. No element, act, or instruction used in this description should be construed as important, necessary, critical, or essential to the invention unless explicitly described as such. Although only a few of the exemplary embodiments have been described in detail herein, those skilled in the art will readily appreciate that many modifications are possible in these exemplary embodiments without materially departing from the novel teachings and advantages of this invention. Accordingly, all such modifications are intended to be included within the scope of this invention as defined in the appended claims.

In the claims, any means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. Unless the exact language "means for" (performing a particular function or step) is recited in the claims, a construction under §112, 6th paragraph is not intended. Additionally, it is not intended that the scope of patent protection afforded the present invention be defined by reading into any claim a limitation found herein that does not explicitly appear in the claim itself.

What is claimed:

1. A fishing attachment for use with a fishing lure comprising at least one hook having a point, bend, and shaft, said fishing attachment comprising:
 a lure dressing;
 a dressing harness carrying said lure dressing, and comprising at least one elongated flexible wing defining a pre-formed wing hole adapted for receiving the point of the hook; and
 a grip ridge formed with said flexible wing of said dressing harness, and adapted for being gripped by a user when applying and removing said fishing attachment to and from the hook of the fishing lure.

2. The fishing attachment according to claim 1, wherein said lure dressing comprises a fishing skirt.

3. The fishing attachment according to claim 2, wherein said fishing skirt comprises a multiplicity of elongated flexible strands.

4. The fishing attachment according to claim 3, wherein said fishing skirt further comprises a centrally-disposed female fitting.

5. The fishing attachment according to claim 4, wherein said dressing harness comprises a centrally-disposed male fitting mated with the female fitting of said fishing skirt.

6. The fishing attachment according to claim 1, wherein said dressing harness comprises a plurality of diverging outwardly extending elongated flexible wings, each flexible wing defining a pre-formed wing hole and comprising a grip ridge adapted for being gripped by a user when applying and removing said fishing attachment to and from the hook of the fishing lure.

7. The fishing attachment according to claim 1, wherein said dressing harness comprises three equally-spaced elongated flexible wings, each flexible wing defining a pre-formed wing hole and comprising a grip ridge adapted for being gripped by a user when applying and removing said fishing attachment to and from the hook of the fishing lure.

8. A fishing attachment for use with a fishing lure comprising at least one hook having a point, bend, and shaft, said fishing attachment comprising:
 a lure dressing; and
 a dressing harness carrying said lure dressing, and comprising a substantially hollow punch-through friction core adapted for receiving the point of the hook to apply and frictionally hold said fishing attachment in a desired location relative to the hook of the fishing lure wherein said dressing harness comprises a plurality of diverging outwardly extending elongated flexible wings, each flexible wing defining a pre-formed wing hole and comprising a grip ridge adapted for being gripped by a user when applying and removing said fishing attachment to and from the hook of the fishing lure.

9. The fishing attachment according to claim 8, wherein said punch-through friction core defines a beveled pre-formed point hole.

10. The fishing attachment according to claim 9, wherein said punch-through friction core further defines a generally conical hollow interior tapering from said point hole to a closed end adapted for being pierced by the point of the hook.

11. The fishing attachment according to claim 8, wherein said lure dressing comprises a fishing skirt.

12. The fishing attachment according to claim 11, wherein said fishing skirt comprises a multiplicity of elongated flexible strands.

13. The fishing attachment according to claim 12, wherein said fishing skirt further comprises a centrally-disposed female fitting.

14. The fishing attachment according to claim 8, wherein said punch-through friction core of said dressing harness forms a centrally disposed male fitting mated with the female fitting of said fishing skirt.

15. The fishing attachment according to claim 8, wherein said dressing harness comprises three equally-spaced elongated flexible wings, each flexible wing defining a pre-formed wing hole and comprising a grip ridge adapted for being gripped by a user when applying and removing said fishing attachment to and from the hook of the fishing lure.

16. A fishing lure including at least one hook having a point, bend, and shank, and further comprising:
 a fishing attachment arranged adjacent the hook, and comprising:
 (i) a lure dressing;
 (ii) a dressing harness carrying said lure dressing, and comprising a substantially hollow punch-through friction core and at least one elongated flexible wing, said punch-through core adapted for receiving the point of the hook to apply and frictionally hold said fishing attachment in a desired location relative to the hook of said fishing lure; and
 (iii) a grip ridge formed with said flexible wing of said dressing harness, and adapted for being gripped by a user when applying and removing said fishing attachment to and from the hook of said fishing lure.

17. The fishing lure according to claim 16, wherein said dressing harness comprises a plurality of diverging outwardly extending elongated flexible wings, each flexible wing defining a pre-formed wing hole and comprising a grip ridge adapted for being gripped by a user when applying and removing said fishing attachment to and from the hook of the fishing lure.

18. The fishing lure according to claim 16, wherein said dressing harness comprises three equally-spaced elongated flexible wings, each flexible wing defining a pre-formed wing hole and comprising a grip ridge adapted for being gripped by a user when applying and removing said fishing attachment to and from the hook of the fishing lure.

19. The fishing lure according to claim 16, wherein said punch-through friction core defines a beveled pre-formed point hole and a generally conical hollow interior, said hollow interior tapering from said point hole to a closed end adapted for being pierced by the point of the hook.

* * * * *